United States Patent
Mosek et al.

(10) Patent No.: US 10,387,271 B2
(45) Date of Patent: Aug. 20, 2019

(54) FILE SYSTEM STORAGE IN CLOUD USING DATA AND METADATA MERKLE TREES

(71) Applicant: Elastifile Ltd., Herzliya (IL)

(72) Inventors: Amir Mosek, Tel Aviv (IL); Shahar Frank, Ramat Hasharon (IL)

(73) Assignee: Elastifile Ltd., Herzliya (IL)

( * ) Notice: Subject to any disclaimer, the term of this patent is extended or adjusted under 35 U.S.C. 154(b) by 152 days.

(21) Appl. No.: 15/591,131

(22) Filed: May 10, 2017

(65) Prior Publication Data
US 2018/0329785 A1 Nov. 15, 2018

(51) Int. Cl.
*G06F 17/00* (2019.01)
*G06F 11/14* (2006.01)

(52) U.S. Cl.
CPC ...... *G06F 11/1464* (2013.01); *G06F 11/1451* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,457,018 B1* | 6/2013 | Ruef | G06F 16/174 370/256 |
| 8,706,701 B1 | 4/2014 | Stefanov et al. | |
| 8,832,466 B1* | 9/2014 | McGregor, Jr. | H04L 9/0836 713/193 |
| 9,705,730 B1* | 7/2017 | Petri | G06F 16/13 |
| 9,886,443 B1 | 2/2018 | Gupta et al. | |
| 10,242,065 B1* | 3/2019 | Starling | H04L 9/0643 |
| 2005/0257074 A1 | 11/2005 | Alkove et al. | |
| 2010/0274772 A1 | 10/2010 | Samuels | |
| 2010/0332401 A1 | 12/2010 | Prahlad et al. | |
| 2013/0104251 A1* | 4/2013 | Moore | G06F 21/602 726/30 |
| 2014/0006465 A1 | 1/2014 | Davis et al. | |
| 2014/0222758 A1* | 8/2014 | March | G06F 17/30212 707/638 |
| 2015/0052144 A1 | 2/2015 | Mari | |
| 2015/0261776 A1 | 9/2015 | Attarde et al. | |
| 2016/0110261 A1 | 4/2016 | Parab et al. | |
| 2017/0075938 A1* | 3/2017 | Black | G06F 21/602 |
| 2017/0249246 A1 | 8/2017 | Bryant et al. | |

(Continued)

OTHER PUBLICATIONS

U.S. Appl. No. 15/406,724 office action dated Jul. 25, 2018.

(Continued)

*Primary Examiner* — Hung D Le
(74) *Attorney, Agent, or Firm* — Kligler & Associates

(57) ABSTRACT

A data storage apparatus includes an interface for communicating with a backup storage system, and one or more processors. The one or more processors are configured to store a local copy of at least part of a file system represented by hierarchical structure of directories and files, to store a backup copy of the at least part of the file system in the backup storage system, to store a dual Merkle tree that is calculated over the backup copy and includes (i) a metadata Merkle tree including Metadata Merkle-Tree Keys (MD-MTKs) and (ii) a data Merkle tree including Data Merkle-Tree Keys (D-MTKs), and to update the backup copy to match the local copy using the dual Merkle tree.

10 Claims, 4 Drawing Sheets

(56) References Cited

U.S. PATENT DOCUMENTS

| | | |
|---|---|---|
| 2017/0277452 A1 | 9/2017 | Joshi |
| 2018/0183592 A1* | 6/2018 | Campagna ............ H04L 9/0836 |
| 2018/0198765 A1* | 7/2018 | Maybee ................ H04L 9/0643 |
| 2018/0275902 A1* | 9/2018 | Monday ................ G06F 3/0632 |

OTHER PUBLICATIONS

Frank et al., U.S. Appl. No. 15/406,724 filed Jan. 15, 2017.
Amazon Web Services, "Amazon Simple Storage Service—Developer Guide", API Version Mar. 1, 2006, 664 pages, Dec. 13, 2016.
U.S. Appl. No. 15/406,724 office action dated Feb. 21, 2019.

* cited by examiner

FILE SYSTEM STORAGE IN CLOUD USING DATA AND METADATA MERKLE TREES

FIELD OF THE INVENTION

The present invention relates generally to data storage, and particularly to methods and systems for file-system management using Merkle trees.

BACKGROUND OF THE INVENTION

A Merkle tree is a tree data structure, in which nodes are labeled with checksums, e.g., hash values, of the labels or values of their child nodes. Merkle trees are used, for example, in various data storage systems for efficient data storage management.

For example, U.S. Pat. No. 8,706,701, whose disclosure is incorporated herein by reference, describes an authenticated file system that provides integrity and freshness of both data and metadata. Example embodiments rely on a balanced, Merkle-tree-based data structure that authenticates the file system directory tree and supports updates caused by file system operations.

As another example, U.S. Patent Application Publication 2016/0110261, whose disclosure is incorporated herein by reference, describes cloud storage schemes using Merkle trees. Exemplary methods include storing a data stream on a client side de-duplicating block store of a client device, generating a data stream Merkle tree of the data stream, storing a secure hash algorithm key for the data stream Merkle tree, as well as the data stream Merkle tree on the client side de-duplicating block store, recursively iterating through the data stream Merkle tree using an index of a snapshot Merkle tree of the client device that is stored on a cloud data center to determine missing Merkle nodes or missing data blocks which are present in the data stream Merkle tree but not present in the snapshot Merkle tree stored on the cloud data center, and transmitting the missing data blocks to the cloud data center.

SUMMARY OF THE INVENTION

An embodiment of the present invention that is described herein provides a data storage apparatus including an interface for communicating with a backup storage system, and one or more processors. The one or more processors are configured to store a local copy of at least part of a file system represented by hierarchical structure of directories and files, to store a backup copy of the at least part of the file system in the backup storage system, to store a dual Merkle tree that is calculated over the backup copy and includes (i) a metadata Merkle tree including Metadata Merkle-Tree Keys (MD-MTKs) and (ii) a data Merkle tree including Data Merkle-Tree Keys (D-MTKs), and to update the backup copy to match the local copy using the dual Merkle tree.

In an embodiment, the one or more processors are configured to update the backup copy by calculating a temporary metadata Merkle tree over the local copy, and updating a sub-tree of the backup copy with a corresponding sub-tree of the local copy only if the MD-MTK of a root node of a corresponding sub-tree in the temporary metadata Merkle tree differs from the MD-MTK of a root node of the corresponding sub-tree in the dual Merkle tree.

In an embodiment, the one or more processors are configured to update the backup copy by scanning the temporary metadata Merkle tree in a Depth-First Search (DFS) order, updating sub-trees for which corresponding root nodes in the temporary metadata Merkle tree and the dual Merkle tree have different MD-MTKs, and refraining from updating the sub-trees for which the corresponding root nodes in the temporary metadata Merkle tree and the dual Merkle tree have matching MD-MTKs.

In an embodiment, the one or more processors are configured to update the backup copy by deciding, based on the temporary metadata Merkle tree, that a file is to be updated in the backup copy to match the local copy, calculating a first D-MTK over at least part of the file in the local copy, comparing the first D-MTK with a second D-MTK of the at least part of the file, which is stored in the dual Merkle tree, and updating the at least part of the file in the backup copy only if the first D-MTK does not match the second D-MTK.

In some embodiments, the one or more processors are configured to store the backup copy by storing at least part of a file in an object whose object name includes the D-MTK of the at least part of the file, and to update the at least part of the file by incrementing a reference count of the object. In an embodiment, the one or more processors are configured to update the at least part of the file by writing content of the at least part of the file to the backup storage system only in response to a failure to increment the reference count.

There is additionally provided, in accordance with an embodiment of the present invention, a method for data storage including storing a local copy of at least part of a file system represented by hierarchical structure of directories and files. A backup copy of the at least part of the file system is stored in a backup storage system. A dual Merkle tree, which is calculated over the backup copy and includes (i) a metadata Merkle tree including Metadata Merkle-Tree Keys (MD-MTKs) and (ii) a data Merkle tree including Data Merkle-Tree Keys (D-MTKs), is stored. The backup copy is updated to match the local copy using the dual Merkle tree.

There is further provided, in accordance with an embodiment of the present invention, a computer software product, the product including a tangible non-transitory computer-readable medium in which program instructions are stored, which instructions, when read by one or more processors, cause the processors to store a local copy of at least part of a file system represented by hierarchical structure of directories and files, to store a backup copy of the at least part of the file system in a backup storage system, to store a dual Merkle tree that is calculated over the backup copy and includes (i) a metadata Merkle tree including Metadata Merkle-Tree Keys (MD-MTKs) and (ii) a data Merkle tree including Data Merkle-Tree Keys (D-MTKs), and to update the backup copy to match the local copy using the dual Merkle tree.

The present invention will be more fully understood from the following detailed description of the embodiments thereof, taken together with the drawings in which:

DETAILED DESCRIPTION OF EMBODIMENTS

Overview

Figure 1:
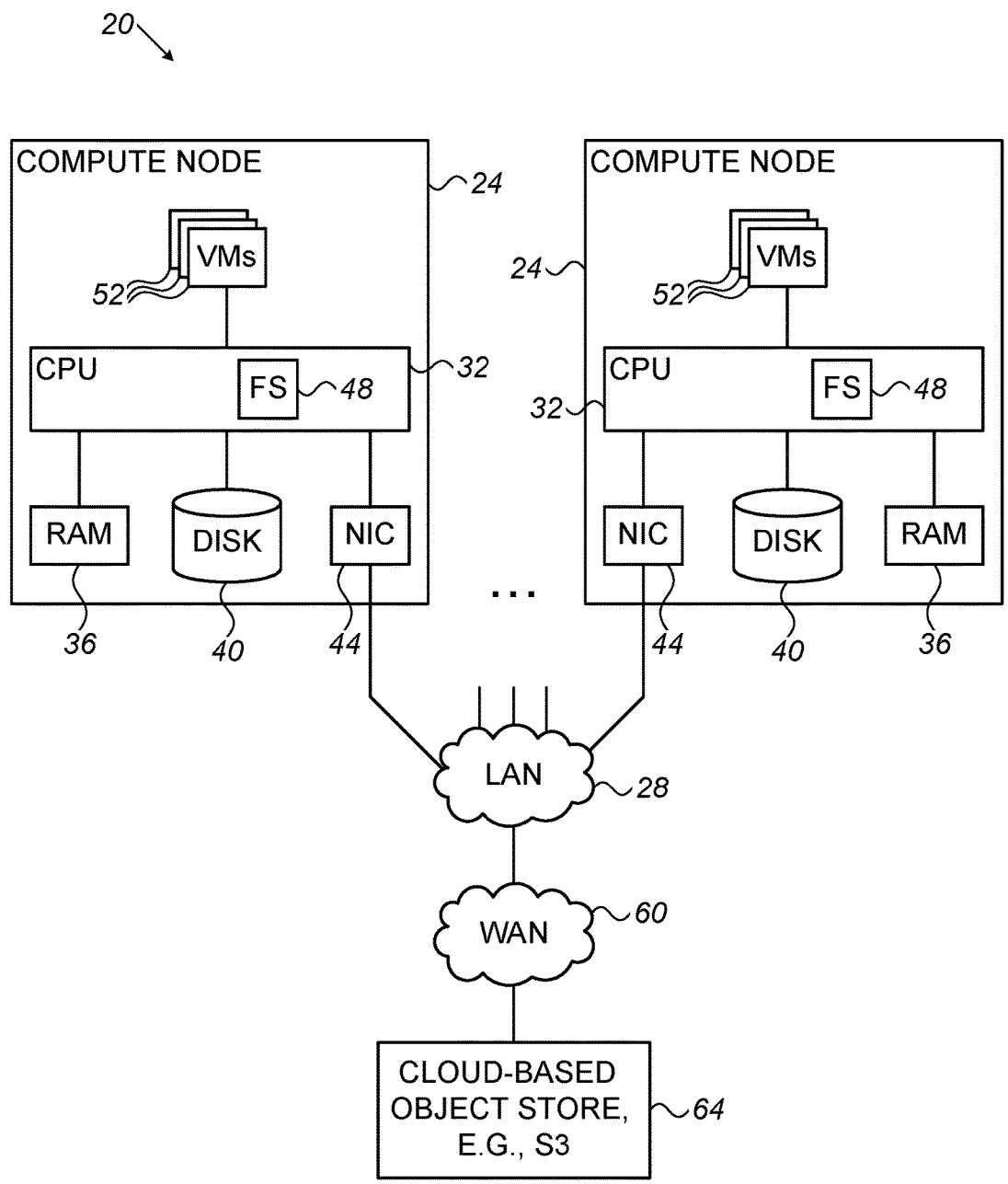
FIG. 1 is a block diagram that schematically illustrates a computing system, in accordance with an embodiment of the present invention.

Embodiments of the present invention that are described herein provide improved methods and systems for maintaining a backup copy of a File System (FS) in a backup storage system, e.g., a cloud-based object storage system. In some embodiments, a computing system comprises multiple compute nodes that communicate over a communication network. Among other tasks, one or more of the compute-node processors run a distributed FS. The processors store a local copy of the FS, and continually update a backup copy of the FS in the backup storage system.

The disclosed embodiments provide a highly efficient process of updating the backup copy, using a "dual Merkle tree." The dual Merkle tree comprises a metadata Merkle tree and a data Merkle tree, both calculated over the backup copy. By using this novel data structure, the backup copy of the FS can be updated without performing search operations on the backup copy, with a minimal number of read operations from the local copy of the FS, and with a minimal amount of network traffic.

In some embodiments, the local copy of the FS is represented by a "FS tree"—A tree data structure representing the hierarchical structure of directories and files of the FS. The leaf nodes of the FS tree represent files (or empty directories), intermediate nodes represent directories, and each of the nodes holds relevant FS metadata. The backup copy of the FS is represented by a similar tree, having the same hierarchical structure, referred to as a "backup tree" or "cloud tree".

In some embodiments, each node of the backup tree (which typically represents a file or directory) also holds a Metadata Merkle-tree Key (MD-MTK) of the metadata Merkle tree, and a Data Merkle-tree Key (D-MTK) of the data Merkle tree. The MD-MTK of a node is calculated over (i) the metadata of the node, and (ii) the MD-MTKs of its child nodes. The D-MTK of a node is calculated over the entire content of the sub-tree of the node including the node itself, and including user data in files, metadata and any other content.

In some embodiments, the processors carry out a two-stage process of updating the backup copy of the FS to match the local copy. In the first stage, the processors create a "temporary Merkle tree," which has the same hierarchical structure as the FS tree and the backup tree. Each node of the temporary Merkle tree holds a MD-MTK that is calculated over (i) the MD-MTKs of its child nodes in the temporary Merkle tree, and (ii) the metadata of the corresponding node in the FS tree. The processors typically create the temporary Merkle tree by scanning the FS tree in a Depth-First Search (DFS) order.

In the second stage of the update process, the processors decide which sub-trees of the backup tree have changed and need to be updated by the corresponding sub-trees of the FS tree, and which sub-trees have not changed and can be skipped. For a given sub-tree, the decision is made by comparing the MD-MTKs of the root node of that sub-tree in the backup tree and in the temporary Merkle tree. Typically, the processors scan the temporary Merkle tree in DFS order and, for each traversed node, decide whether to skip or update the sub-tree of that node.

Even when a certain sub-tree of the backup tree needs to be updated (because the MD-MTK of this sub-tree in the temporary Merkle tree differs from the MD-MTK of the corresponding sub-tree in the backup tree), the processors do not actually copy the entire sub-tree of the FS tree indiscriminately to the backup tree. The processors traverse the sub-tree and rewrite only parts of it that have changed. When reaching a leaf node, which represent a file, the processors compare the Data MTKs (D-MTKs) of corresponding parts ("data blobs") of the file in the FS tree and in the backup tree. A given data blob is actually written to the backup tree only if its D-MTK in the backup tree does not match the corresponding D-MTK in the FS tree.

Moreover, in some embodiments in which the backup storage system comprises a cloud-based object store, the processors further reduce write operations to the cloud by using the built-in de-duplication and reference-counting features of the cloud-based object store. In an embodiment, the processors store each data blob in the cloud in an object, whose name is the D-MTK of the data blob. When a data blob needs to be updated in the backup tree, the processors attempt to increment the reference count of the corresponding object. Only if the update fails, implying that no object having the same content as the data blob already exists in the backup copy, the data blob is actually written to the cloud. Otherwise, only the reference count is incremented.

As can be appreciated from the description above, the disclosed update process is highly efficient in terms of read and write operations to the backup storage system (e.g., cloud-based object store), and in terms of communication traffic over the network between compute nodes. The update process typically begins by finding files and directories that are suspected as changed, using the metadata Merkle tree. Only then, those files are checked with finer resolution of data blobs for actual data changes, using the data Merkle tree. As a result, the update process is fast, low-cost and scalable.

System Description

FIG. 1 is a block diagram that schematically illustrates a computing system 20, in accordance with an embodiment of the present invention. System 20 may comprise, for example, a data center, a High-Performance Computing (HPC) system, or a computing system that performs any other suitable function.

System 20 comprises multiple compute nodes 24 that communicate with one another over a network 28, in the present example a Local Area Network (LAN). Compute nodes 24 are referred to herein as nodes, for brevity, and may comprise, for example, servers, workstations or any other suitable type of compute node. Nodes 24 may communicate over network 28 in accordance with any suitable network communication protocol, such as Ethernet or Infiniband. System 20 may comprise any suitable number of compute nodes of any type. Nodes 24 may be collocated or located in multiple geographical locations. The collection of nodes 24 is also sometimes referred to as a cluster.

In the present example, each node 24 comprises a Central Processing Unit (CPU) 32, also referred to as a processor. Each node also comprises a volatile memory 36 such as Random Access Memory (RAM), and non-volatile storage 40, also referred to simply as disk, such as one or more Solid State Drives (SSDs) or Hard Disk Drives (HDDs). Each node 24 further comprises a network interface 44 such as a Network Interface Controller (NIC) for communicating over network 28.

CPU 32 of each node 24 runs one or more workloads, in the present example Virtual Machines (VMs) 52. Although the embodiments described herein refer mainly to VMs, the disclosed techniques can be used with any other suitable type of workloads, e.g., user applications, operating system processes or containers, and/or any other suitable software.

In some embodiments, each CPU 32 runs a respective File System (FS) module 48 that carries out various file management functions. The plurality of modules 48, running on CPUs 32 of nodes 24, implement a distributed FS that manages the storage of files. This distributed FS typically serves the various VMs 52 using a suitable storage protocol such as Network File System (NFS) or Server Message Block (SMB). In alternative embodiments, system 20 may run a centralized FS, e.g., on a dedicated server, instead of a distributed FS.

In the embodiment of FIG. 1, computing system 20 is connected via a Wide Area Network (WAN) 60, e.g., the Internet, to a cloud-based object storage system 64. Storage system 64 serves as the persistent storage media in which the distributed FS backs-up its data and metadata, e.g., copies of files and directories. In the embodiments described herein, object storage system 64 comprises the Amazon Simple Storage Service (S3). The description that follows refers simply to "S3" for brevity. Alternatively, any other suitable cloud-based object storage system, e.g., Google Cloud Storage or Microsoft Azure, can be used.

The configurations of system 20 and nodes 24 shown in FIG. 1 are example configurations that are chosen purely for the sake of conceptual clarity. In alternative embodiments, any other suitable system and/or node configuration can be used. For example, some or even all of the functionality of modules 48 may be implemented on one or more processors that are separate from nodes 24.

The different elements of system 20 and nodes 24 may be implemented using suitable hardware, using software, or using a combination of hardware and software elements. In some embodiments, CPUs 32 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

For the sake of clarity, the description that follows refers to "the FS" as carrying out the various storage tasks. In various embodiments, the functionality of the FS may be carried out by any one or more processors in system 20, e.g., collectively by FS modules 48 running on CPUs 32 of nodes 24, and/or by a processor of a dedicated centralized server.

For the sake of clarity, the description that follows refers to "the FS memory" as storing certain data structures. In various embodiments, the FS memory may comprise any suitable memory space associated with compute nodes 24, e.g., on one or more of RAM devices 36.

Data Structures Used for File System Storage and Cloud Backup

In some embodiments, system 20 backs-up its FS to cloud-based object storage system 64, in the present example to S3. The back-up typically comprises retaining on S3 an updated copy of the entire hierarchical structure of the FS directories and files, including both user file data and metadata. As will be explained below, the FS carries out a highly efficient process of updating the FS to S3, which has the following characteristics:

Updating is performed without performing search operations on the cloud version of the FS, thereby reducing the number of expensive readout operations from the cloud.

Updating is performed with a minimal amount of traffic exchange over network 32.

Figure 2:
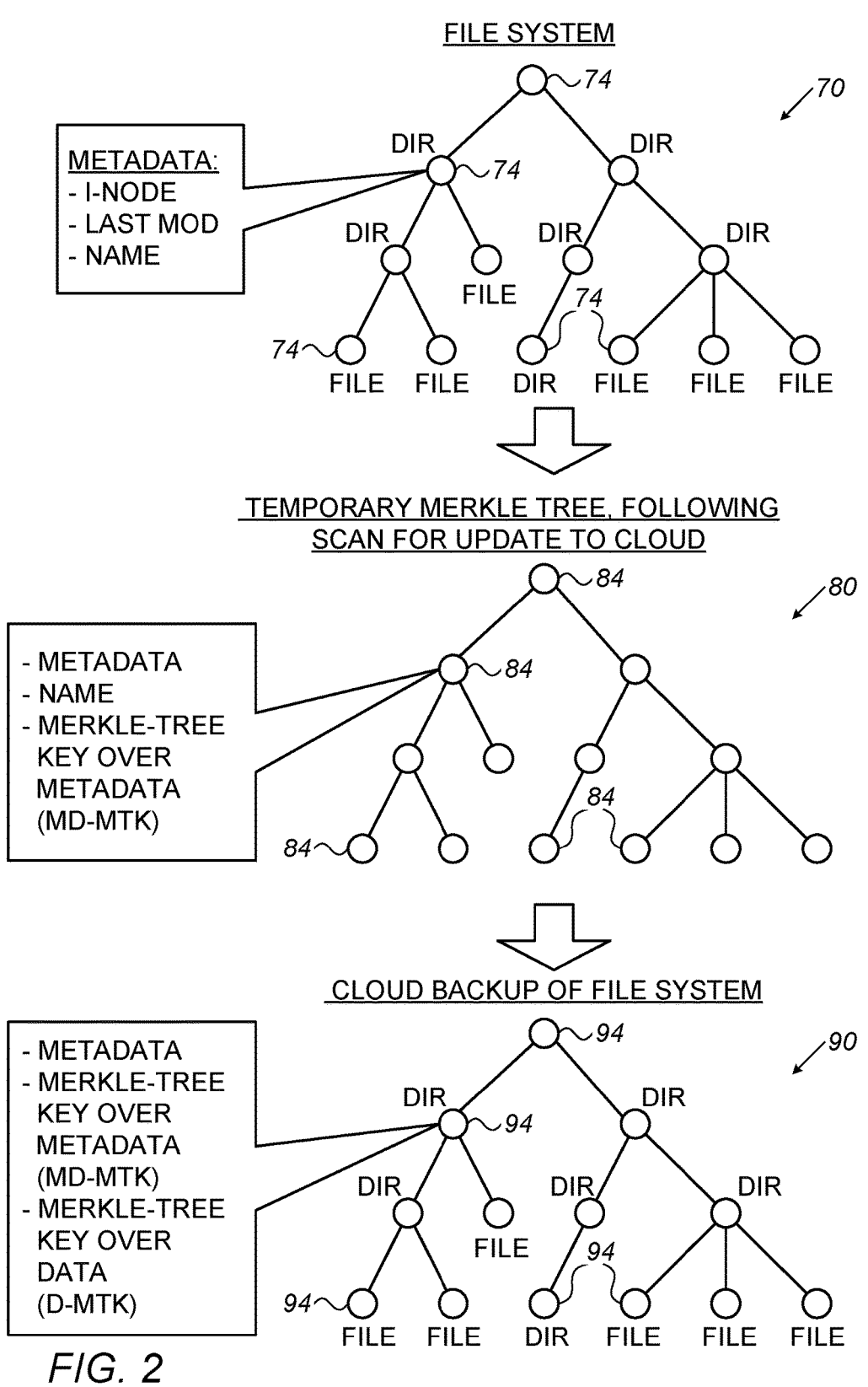
FIG. 2 is a diagram that schematically illustrates tree data structures used in the computing system of FIG. 1, in accordance with an embodiment of the present invention.

FIG. 2 is a diagram that schematically illustrates three tree data structures used for representing and updating the FS of system 20, in accordance with an embodiment of the present invention. The three data structures are used for representing the FS, both locally in system 20 and in the cloud (in S3), and for the cloud update process. For clarity, the description that follows refers to updating of the entire FS. Alternatively, however, the data structures and processes described herein can also be used for updating only selected parts of the FS, e.g., specific directories.

FS Tree

The top of FIG. 2 shows an example "FS tree" 70, a data structure used for representing the FS locally in system 20. Tree 70 is stored locally in system 20, e.g., in a suitable location in RAM devices 36 and/or disks 40.

FS tree 70 comprises multiple nodes 74, stemming from a root node (at the top) and ending with leaf nodes (at the bottom). Each leaf node represents a file or an empty directory. Each intermediate node represents a directory, which may contain one or more files and/or one or more directories. The root node represents the entire FS. The part of the tree that stems from a certain node is referred to as the sub-tree of that node.

The parent-child relationships between nodes 74 represent the hierarchical structure of the FS. In this representation, node X being a child of node Y means that the file or directory represented by node X is contained in the directory represented by node Y. As can be seen in the present example, the FS tree need not necessarily be binary, need not necessarily be balanced, and need not necessarily have a uniform number of levels.

Each node 74 in FS tree 70 stores metadata that pertains to itself and to its sub-tree. In the present example the metadata comprises:

A unique node index denoted I-NODE.

A time stamp of the most recent time any file or directory in the node's sub-tree was modified, denoted "LAST MOD".

A unique name.

When a leaf node 74 of FS tree 70 represents a file, the node also comprises one or more pointers to "data blobs" that hold the actual data of the file. The data blobs typically comprise memory regions in the FS memory (e.g., across RAM devices 36).

(In an alternative embodiment, the node index I-NODE is omitted from the calculation of the MD-MTK. This feature is useful, for example, for efficiently creating and storing copies of FSs.)

Temporary Merkle Tree

The middle of FIG. 2 shows an example "Temporary Merkle tree" 80, a data structure that the FS produces temporarily when backing-up the FS to S3. Tree 80 is stored locally in system 20, e.g., in a suitable location in RAM devices 36 and/or disks 40. The backup process, including generation and usage of Merkle tree 80, is described in FIGS. 3 and 4 below.

Merkle tree 80 comprises multiple nodes 84, and has the same hierarchical structure as FS tree 70. In other words, each node 84 in tree 80 corresponds to a respective node 74 in tree 70 (and thus represents the same file or directory as its corresponding node 74). The parent-child hierarchy among nodes 84 is also the same as the hierarchy among nodes 74.

In the present example, during the backup process, the FS stores the following parameters in each node 84 of Merkle tree 80:

The metadata stored in the corresponding node 74 of FS tree 70.

A unique name.

A Metadata Merkle-Tree Key (MD-MTK), which is calculated over (i) the metadata stored in the corresponding node 74 of FS tree 70, and (ii) the MD-MTKs of the child nodes of the node 84 in question.

In an embodiment, the FS produces the MD-MTK of each node 84 by calculating a hash function over (i) the metadata of the corresponding node 74 of FS tree 70, and (ii) the MD-MTKs of the child nodes of the node 84 in question. Any suitable hash function can be used for this purpose. Alternatively, the FS may produce the MD-MTK by calculating any other suitable checksum or signature.

Typically, the checksum used for calculating the MD-MTK (the type of checksum and the parameters over which it is calculated) guarantees the following: If two nodes are found to have the same MD-MTK, then they represent identical FS sub-trees with very high likelihood. As will be explained below, this property enables the update process to skip entire FS sub-trees without scanning them.

Backup Tree/Cloud Tree

The bottom of FIG. 2 shows an example "cloud tree" 90, a data structure used for representing the backed-up version of the FS in S3. The cloud tree is also referred to as "backup tree," and the two terms are used interchangeably. Tree 90 is stored "in the cloud," e.g., in cloud-based object storage system 64.

Cloud tree 90 comprises multiple nodes 94, and has the same hierarchical structure as FS tree 70 and temporary Merkle tree 80. In other words, each node 94 in tree 90 corresponds to a respective node 74 in tree 70, and to a respective node 84 in tree 80 (and thus also represents the same file or directory as its corresponding node 74). The parent-child hierarchy among nodes 94 is also the same as the hierarchy among nodes 74, and among nodes 84.

In the present example, in the backup process, the FS stores the following parameters in each node 94 of cloud tree 90:

The metadata stored in the corresponding node 74 of FS tree 70.

The MD-MTK stored in the corresponding node 84 of temporary Merkle tree 80.

An additional Merkle-Tree Key (MTK), which is calculated over the entire sub-tree of the node 94 in question in tree 90. This MTK is referred to as "data MTK" and is denoted D-MTK. Typically, the D-MTK is calculated over the entire content of the sub-tree, including user data in files, metadata and any other content.

In some embodiments, the main difference between temporary Merkle tree 80 and backup tree 90 is that the nodes of temporary Merkle tree 80 comprise MD-MTKs and do not point to any user file data. In backup tree 90, on the other hand, the nodes comprise, in addition to the MD-MTKs, also D-MTKs that function as a pointers to user data blobs.

In an embodiment, the FS produces the D-MTK of each node 94 by calculating a hash function over the sub-tree of this node 94 in cloud tree 90. Any suitable hash function can be used for this purpose. Alternatively, the FS may produce the D-MTK by calculating any other suitable checksum or signature.

Typically, the checksum used for calculating the D-MTK guarantees the following: If two nodes are found to have the same D-MTK, then they represent identical sub-trees with very high likelihood. The type of checksum used for calculating the D-MTK may be the same as or different from the type of checksum used for calculating the MD-MTK.

Cloud tree 90 is an example of a dual Merkle tree. In the context of the present patent application and in the claim, the term "dual Merkle tree" refers to any suitable data structure, or multiple data structures, that hold Metadata Merkle-Tree Keys (MD-MTKs) and Data Merkle-Tree Keys (D-MTKs) calculated over metadata and data, respectively, of at least part of a file system. In alternative embodiments, the FS may represent the dual Merkle tree in any other suitable manner.

File System Cloud Update Process

Figure 3:
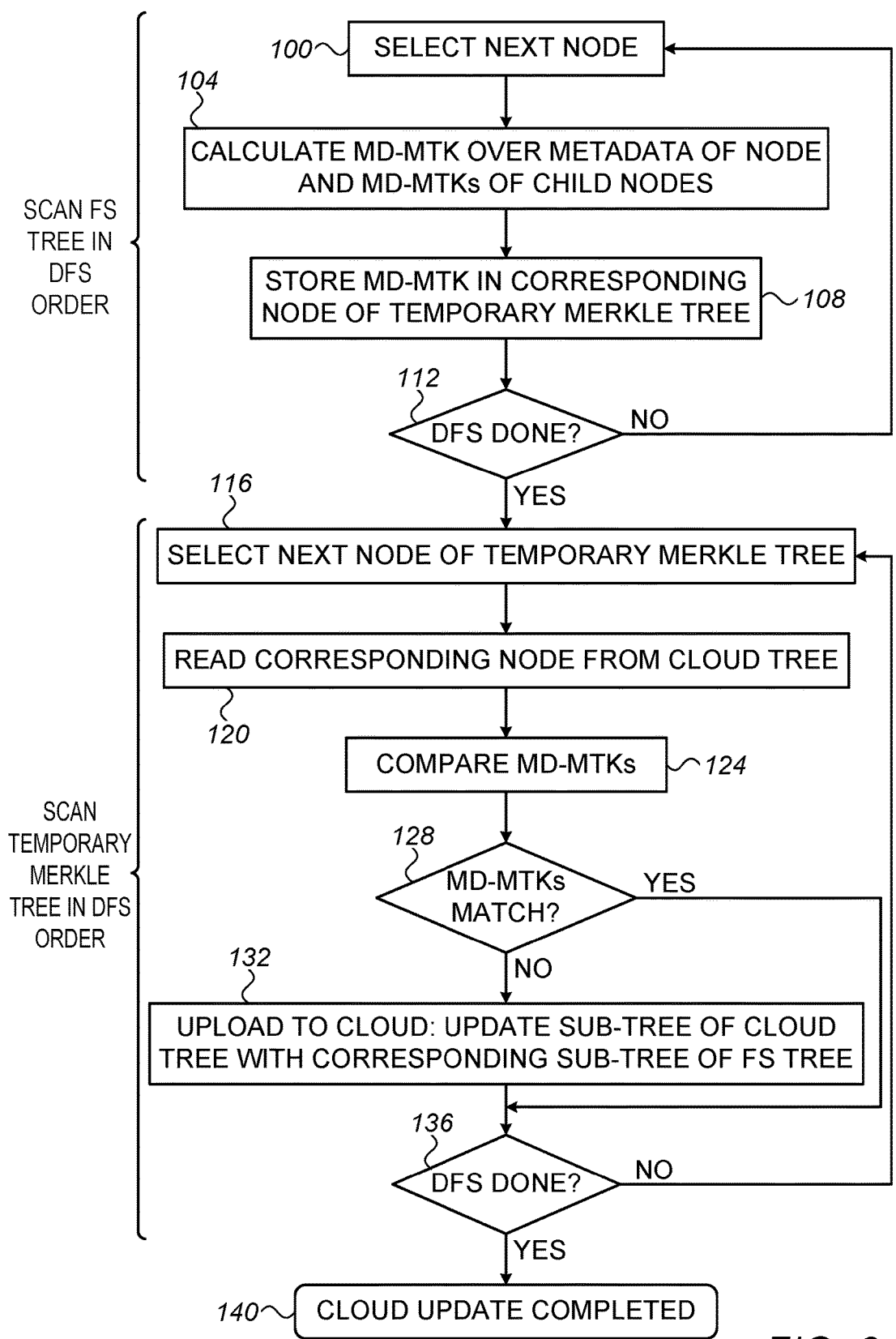
FIG. 3 is a flow chart that schematically illustrates a method for backing-up a file system to a cloud-based object store, in accordance with an embodiment of the present invention.

FIG. 3 is a flow chart that schematically illustrates a method for backing-up the FS of system 20 to S3, in accordance with an embodiment of the present invention. As noted above, this process may be performed by any processor or processors in system 20. The update process may be performed periodically, or in response to some event, e.g., an administrator command.

The method of FIG. 3 has two main stages. In the first stage (illustrated by steps 100-112), the FS scans FS tree 70 in a Depth-First Search (DFS) order and constructs temporary Merkle tree 80. In the second stage (illustrated by steps 116-136), the FS scans temporary Merkle tree 80 in a Depth-First Search (DFS) order and updates cloud tree 90 stored in S3.

The first stage (construction of temporary Merkle tree 80 based on FS tree 70) begins with the FS selecting the next node 74 (initially the root node) of FS tree 70 in accordance with the DFS order, at a node selection step 100.

At a MD-MTK calculation step 104, the FS calculates a MD-MTK for the node 84 (in temporary Merkle tree 80) that corresponds to the selected node 74. The MD-MTK is calculated over (i) the metadata of the selected node 74, and (ii) the MD-MTKs of the child nodes of the corresponding node 84. The FS stores the MD-MTK in the corresponding node 84 of temporary Merkle tree 80, at a MD-MTK storage step 108.

At a checking step 112, the FS checks whether the entire FS tree 70 has been scanned. If not, the method loops back to step 100 above, in which the FS selects the next node 74. Otherwise, the method proceeds to the second stage.

The second stage (updating of cloud tree 90 in S3 based on temporary Merkle tree 80) begins with the FS selecting the next node 84 (initially the root node) of temporary Merkle tree 80 in accordance with the DFS order, at a node selection step 116. The FS reads the corresponding node 94 of cloud tree 90 from S3, at a cloud readout step 120.

At a MD-MTK comparison step 124, the FS compares the MD-MTK of the currently selected node 84 of temporary Merkle tree 80 with the MD-MTK of the corresponding node 94 read from cloud tree 90. At a match checking step 128, the FS checks whether the two MD-MTKs are the same or not.

As explained above, if the two MD-MTKs are the same, the FS may conclude that the existing sub-tree of the node 94 in cloud tree 90 is identical to the sub-tree of the corresponding node 74 in FS tree 70. In other words, if the two MD-MTKs are the same, the entire sub-tree of the corresponding node 74 of FS tree 70 does not need to be updated in the cloud and can be safely skipped. Otherwise, if the two MD-MTKs are not the same, the FS concludes that some difference exists between the sub-tree of the node 94 in cloud tree 90 and the sub-tree of the corresponding node 74 in FS tree 70. In the latter case, the update process should continue scanning inside this sub-tree and update the cloud tree as appropriate.

Thus, if checking step 128 concludes that the two MD-MTKs do not match, the FS updates the sub-tree of the node 94 in cloud tree 90 with the corresponding sub-tree of FS tree 70, at a sub-tree updating step 132.

Typically, in step 132, the FS does not actually copy the entire sub-tree from FS tree 70 to cloud tree 90, but only the parts of the sub-tree that have changed since the last update. The FS typically scans the sub-tree of temporary Merkle tree 80 using DFS, and continues to compare MD-MTKs. Any part of the sub-tree whose MD-MTK matches the corresponding MD-MTK in cloud tree 90 is skipped, and DFS scanning continues only within sub-trees whose MD-MTK does not match the corresponding MD-MTK in cloud tree 90. This process continues until reaching a leaf node of temporary Merkle tree 80 whose MD-MTK does not match the corresponding MD-MTK in cloud tree 90. Only at this stage, actual data has to be copied from the FS to the cloud. This selective data updating process is described in detail in FIG. 4 below. If checking step 128 concludes that the two MD-MTKs match, sub-tree updating step 132 is skipped.

At a completion checking step 136, the FS checks whether the entire temporary Merkle tree 80 has been scanned. If not, the method loops back to step 116 above, in which the FS selects the next node 84. Otherwise, the method terminates at a termination step 140.

Figure 4:
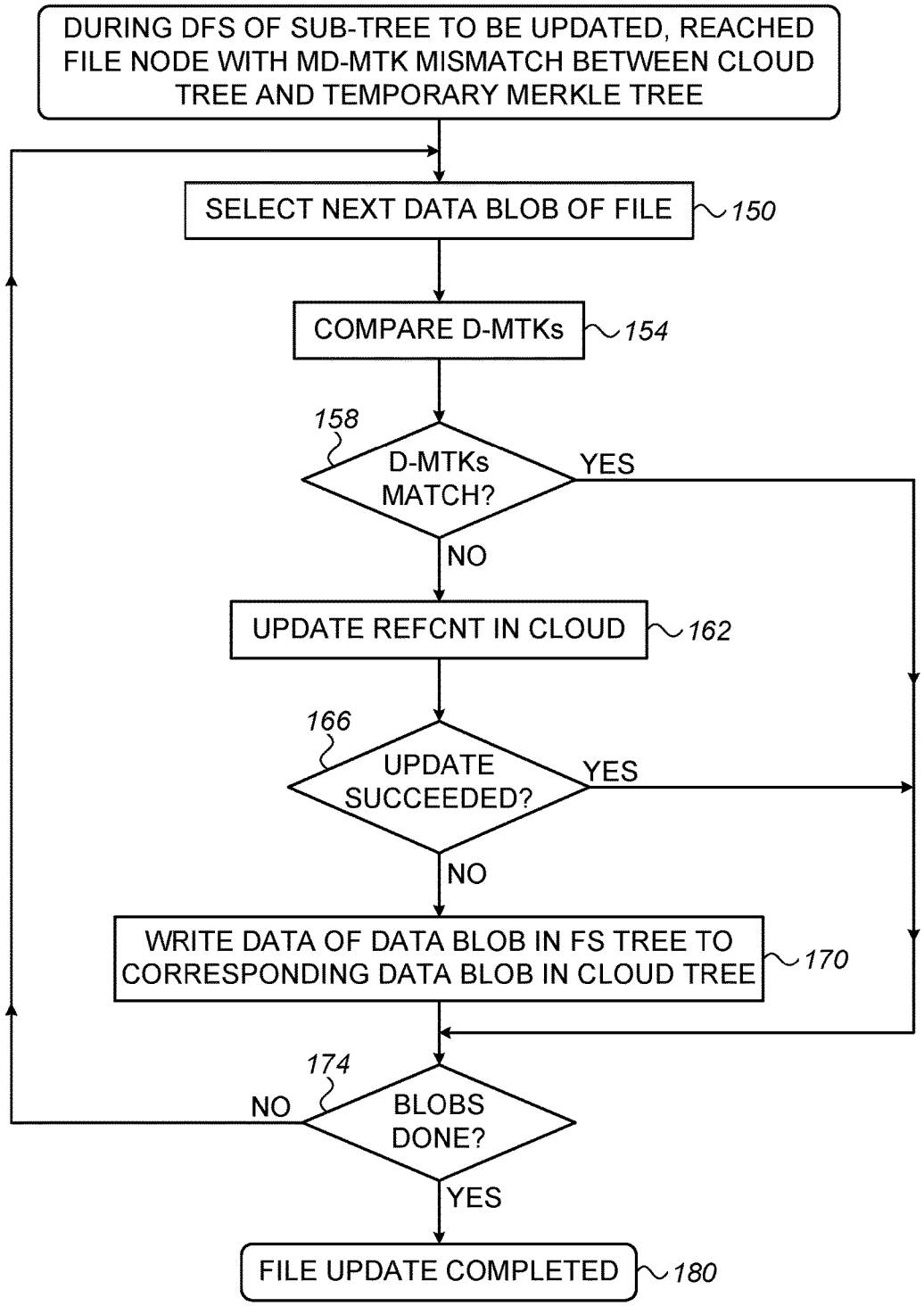
FIG. 4 is a flow chart that schematically illustrates a method for updating a file to a cloud-based object store, in accordance with an embodiment of the present invention.

FIG. 4 is a flow chart that schematically illustrates a method for updating a file from FS tree 70 to cloud tree 90, in accordance with an embodiment of the present invention. The method of FIG. 4 can be used as part of sub-tree updating step 132 of FIG. 3 above. As explained above, the method of FIG. 4 is invoked when step 132 of FIG. 3 reaches a leaf node of temporary Merkle tree 80 whose MD-MTK does not match the corresponding MD-MTK in cloud tree 90.

This mismatch in MD-MTK means that the file represented by the leaf node has changed since the most recent update of the FS to the cloud. In such a case, the FS scans the data blobs of the file in question, skips any data blobs that have not changed, and copies to the cloud only data blobs that have changed. The FS distinguishes between data blobs that have changed and data blobs that have not changed by comparing corresponding data MTKs (D-MTKs) in FS tree 70 and cloud tree 90.

The method of FIG. 4 begins with the FS selecting the next data blob (initially the first data blob) of the file in question, at a data blob selection step 150. At a D-MTK comparison step 154, the FS compares the D-MTK of the selected data blob in FS tree 70 with the D-MTK of the corresponding data blob in cloud tree 90. The FS checks whether the two D-MTKs match, at a match checking step 158.

If the two D-MTKs do not match, the FS replaces the data blob in cloud tree 90 with the corresponding (and more up-to-date) data blob of FS tree 70. The replacement process, in an embodiment, is illustrated by steps 162-170. In the present example, the FS stores each data blob in S3 as an object whose name is the D-MTK of the data blob. In practice, data blobs having the same data may appear in different files. In such a case, the FS does not write the actual data multiple times to the cloud, but only writes the metadata of the data blob and increments the reference count (REFCNT) of the existing object. The above-described naming convention (D-MTK used as the object name) essentially implements de-duplication. Further aspects of this technique are addressed in U.S. patent application Ser. No. 15/406,724, entitled "Object Storage in Cloud with Reference Counting using Versions," which is assigned to the assignee of the present patent application and whose disclosure is incorporated herein by reference.

Thus, if the D-MTK of the selected data blob in FS tree 70 does not match the D-MTK of the corresponding data blob in cloud tree 90, the FS attempts to update the reference count of the object (whose name is the D-MTK of the data blob of FS tree 70) in S3, at a REFCNT updating step 162. At a success checking step 166, the FS checks whether the REFCNT update was successful or not.

If S3 acknowledged that the REFCNT was updated successfully, the FS concludes that an object having the same data indeed already exists in the cloud. In such a case, only the REFCNT is updated, and there is no need to write the actual data of the data blob to the cloud.

Otherwise, if S3 returns a notification that the REFCNT update has failed, the FS concludes that an object having the same data does not exist in the cloud. Only in this case, at an overwriting step 170, the FS overwrites the data blob in cloud tree 90 with the actual data of the data blob of FS tree 70. The FS performs this action by writing to S3 a new object whose name is the D-MTK of the data blob of FS tree 70.

At a data-blob completion checking step 174, the FS checks whether all the data blobs of the file have been checked. If not, the method loops back to step 150 above for selecting (and possibly updating) the next data blob. Otherwise, the method terminates at a termination step 178.

The method flows of FIGS. 3 and 4 above are example flows, which are chosen purely for the sake of conceptual clarity. In alternative embodiments, the FS of system 20 may perform back-up to the cloud, based on both MD-MTKs and D-MTKs, using any other suitable method.

Although the embodiments described herein refer mainly to backup of a file system to an object-based cloud storage system, the disclosed techniques can also be used for backup to any other backup storage system, which is not necessarily a cloud system and is not necessarily object based. An alternative example of a backup storage system is a LAN-based object storage system. Systems of this sort are offered, for example, by Cloudian (San Mateo, Calif.), Dell EMC (Hopkinton, Mass.), and others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A data storage apparatus, comprising:
an interface, for communicating with a backup storage system; and
one or more processors, configured to:
store a local copy of at least part of a file system represented by a hierarchical structure of nodes, each node including content and corresponding metadata;
store a backup copy of the at least part of the file system in the backup storage system;
store a metadata Merkle tree that is calculated over the backup copy, wherein each given node in the metadata Merkle tree includes a metadata key calculated over the metadata of a corresponding node of the backup copy, but not over the content of the corresponding node, and over the metadata keys of the child nodes of the given node; and
update the backup copy to match the local copy using the metadata Merkle tree, by:
calculating a temporary metadata Merkle tree over the stored local copy;
determining nodes of the temporary metadata Merkle tree having a different metadata key than the corresponding metadata key of the stored metadata Merkle tree; and
for the nodes determined to have a different metadata key, updating the content of the backup copy from the content of the stored local copy.

2. The apparatus according to claim 1, wherein the one or more processors are configured to update the content of the backup copy by:
calculating a first data key over at least part of the file in the local copy;
comparing the first data key with a second data key of the at least part of the file, which is stored in the metadata Merkle tree; and
updating the at least part of the file in the backup copy only if the first data key does not match the second data key.

3. The apparatus according to claim 2, wherein the one or more processors are configured to store the backup copy by storing at least part of a file in an object whose object name comprises the data key of the at least part of the file, and to update the at least part of the file by incrementing a reference count of the object.

4. The apparatus according to claim 3, wherein the one or more processors are configured to update the at least part of the file by writing content of the at least part of the file to the backup storage system only in response to a failure to increment the reference count.

5. The apparatus according to claim 1, wherein the corresponding metadata of each node comprises a time stamp of a most recent time the content of the node was modified.

6. A method for data storage, comprising:
storing a local copy of at least part of a file system represented by a hierarchical structure of nodes, each node including content and corresponding metadata;
storing a backup copy of the at least part of the file system in a backup storage system;
storing a metadata Merkle tree that is calculated over the backup copy, wherein each given node in the metadata Merkle tree includes a metadata key calculated over the metadata of a corresponding node of the backup copy, but not over the content of the corresponding node, and over the metadata keys of the child nodes of the given node; and
updating the backup copy to match the local copy using the metadata Merkle tree, by:
calculating a temporary metadata Merkle tree over the stored local copy;
determining nodes of the temporary metadata Merkle tree having a different metadata key than the corresponding metadata key of the stored metadata Merkle tree; and
for the nodes determined to have a different metadata key, updating the content of the backup copy from the content of the stored local copy.

7. The method according to claim 6, wherein updating the content of the backup copy comprises:
calculating a first data key over at least part of the file in the local copy;
comparing the first data key with a second data key of the at least part of the file, which is stored in the metadata Merkle tree; and
updating the at least part of the file in the backup copy only if the first data key does not match the second data key.

8. The method according to claim 7, wherein storing the backup copy comprises storing at least part of a file in an object whose object name comprises the data key of the at least part of the file, and wherein updating the backup copy comprises updating the at least part of the file by incrementing a reference count of the object.

9. The method according to claim 8, wherein updating the at least part of the file comprises writing content of the at least part of the file to the backup storage system only in response to a failure to increment the reference count.

10. A computer software product, the product comprising a tangible non-transitory computer-readable medium in which program instructions are stored, which instructions, when read by one or more processors, cause the processors to:
store a local copy of at least part of a file system represented by a hierarchical structure of nodes, each node including content and corresponding metadata;
store a backup copy of the at least part of the file system in a backup storage system;
store a metadata Merkle tree that is calculated over the backup copy, wherein each given node in the metadata Merkle tree includes a metadata key calculated over the metadata of a corresponding node of the backup copy, but not over the content of the corresponding node, and over the metadata keys of the child nodes of the given node; and
update the backup copy to match the local copy using the metadata Merkle tree, by:
calculating a temporary metadata Merkle tree over the stored local copy;
determining nodes of the temporary metadata Merkle tree having a different metadata key than the corresponding metadata key of the stored metadata Merkle tree; and
for the nodes determined to have a different metadata key, updating the content of the backup copy from the content of the stored local copy.

* * * * *